United States Patent
Bichlmaier

[11] Patent Number: 5,710,671
[45] Date of Patent: Jan. 20, 1998

[54] OPTICAL SYSTEM

[75] Inventor: Günther Bichlmaier, Altdorf, Germany

[73] Assignee: Temic Telefunken Microelectronic GmbH, Heilbronn, Germany

[21] Appl. No.: 711,322

[22] Filed: Sep. 3, 1996

[30] Foreign Application Priority Data

Sep. 5, 1995 [DE] Germany .................... 195 32 680.6

[51] Int. Cl.$^6$ ........................................... G02B 3/08
[52] U.S. Cl. ..................... 359/742; 359/627; 359/537
[58] Field of Search ........................... 359/741, 742, 359/743, 534, 537, 627

[56] References Cited

U.S. PATENT DOCUMENTS

| 3,447,860 | 6/1969 | Lucas | 359/743 |
|---|---|---|---|
| 3,712,713 | 1/1973 | Appledorn | 359/741 |
| 4,321,594 | 3/1982 | Galvin et al. | 340/567 |
| 4,772,797 | 9/1988 | Kahl et al. | 359/742 |
| 4,933,560 | 6/1990 | Messiou et al. | 250/353 |
| 5,398,137 | 3/1995 | Ishikawa et al. | 359/743 |
| 5,446,594 | 8/1995 | Nelson et al. | 359/742 |

FOREIGN PATENT DOCUMENTS

| 0197583 | 10/1986 | European Pat. Off. . | |
|---|---|---|---|
| 0262241 | 4/1988 | European Pat. Off. . | |
| 0441713 | 8/1991 | European Pat. Off. . | |
| 3235250 | 3/1984 | Germany . | |
| 3742031 | 6/1989 | Germany . | |
| 3906761 | 9/1989 | Germany . | |
| 3826645 | 11/1989 | Germany . | |
| 4030822 | 4/1992 | Germany . | |
| 4312904 | 12/1994 | Germany . | |
| 4334197 | 4/1995 | Germany . | |
| 4407911 | 9/1995 | Germany . | |
| 4417710 | 9/1995 | Germany . | |
| 4-96378 | 3/1992 | Japan . | |
| 1569263 | 11/1980 | United Kingdom | 359/741 |
| 88/03658 | 5/1988 | WIPO . | |

*Primary Examiner*—David C. Nelms
*Assistant Examiner*—Thomas Robbins
*Attorney, Agent, or Firm*—Spencer & Frank

[57] ABSTRACT

An optical system with an optical unit consisting of a transmission unit with at least one transmission element for emitting optical radiation, a receiving unit with at least one receiving element for detecting optical radiation and an optical path for transmitting the optical radiation between transmission unit and receiving unit. At least one optical unit is located in the optical path to bundle and deflect the optical radiation and an optical body/optical bodies is/are assigned to either the transmission unit or the receiving unit. The optical bodies are designed as a kind of Fresnel lens and have an unstructured surface side and a structured surface side having indentations with steep flanks large slope angle and a small prism angle. The structured surface side of the optical body with indentations forms a first boundary surface for total reflection and a second boundary surface for refracting the optical radiation emitted from the transmission unit or the optical radiation detected by the receiving unit and is turned away from either the transmission unit or the receiving unit.

9 Claims, 3 Drawing Sheets

OPTICAL SYSTEM

BACKGROUND OF THE INVENTION

The optical unit of many optical systems (for instance, (IR) remote control systems, optical signal transmission systems, or optical theft-prevention alarm systems) consists of a transmission unit with one or several transmission elements, a receiving unit with one or several receiving elements, and an optical path linking together the transmission unit and the receiving unit: The optical radiation sent out from the transmission unit is detected by the receiving unit after traversing the optical path and this received signal is processed further in an evaluation unit of the optical system. The received signal is affected by a change in the system properties (for example, as a result of a variation in the transmitted optical radiation due to the transmission of differently encoded signals or by changes in the optical path) and this received signal is evaluated by the evaluation unit.

In order to influence the optical properties of the optical unit (for instance, with a view to increasing homogenization of the sensitivity of the receiving unit), an optical body can be placed in the optical path. From EP 441 713, it is known that these optical bodies can be designed as toroidal aspherical external covering lens enclosing several receiving elements (photocells) of the receiving unit. Furthermore, in DE 44 07 911, a catadioptric optical body placed in the optical path between transmission unit and receiving unit in order to deflect and bundle the radiation emitted from the transmission unit to the (only) receiving element of the receiving unit is described.

SUMMARY OF THE INVENTION

The object of the invention is to specify an optical system that has advantageous properties, in particular a simple and low-cost design and a favorable distribution of the optical radiation (large deflection angle).

The above object generally is achieved according to the invention by an optical system with an optical unit comprising: a transmission unit with at least one transmission element for emitting optical radiation; a receiving unit with at least one receiving element for detecting optical radiation; and an optical path for transmitting the optical radiation between the transmission unit and the receiving unit; and wherein, in order to improve the optical properties of the optical system, at least one optical body of the Fresnel lens type ("quasi Fresnel lens") with a structured surface side and an unstructured side is provided in the optical path between the transmission unit and the receiving unit; the optical body/bodies is/are associated with the transmission unit or the receiving unit, where the optical body is arranged in the immediate proximity of the transmission unit or the receiving unit, respectively, and the unstructured surface side is oriented towards the transmission unit or the receiving unit, respectively. The structured surface side of the optical bodies/body has a grooved structure and indentations are provided in one surface side of the optical body with a specific variable slope angle; the indentations allow lens areas to be defined with a specific prism angle that on the one hand causes total reflection (mirror effect) on a first boundary surface and refraction of the optical radiation on a second boundary surface. The indentations (depth, arrangement) and thus the angles of gradient and the complementary prism angles are predefined in such a way that, on the one hand, total reflection of the optical radiation takes place and, on the other hand the radiation can escape from the optical bodies at the refractive boundary surface. A variation of the slope angle and prism angle is possible under these general conditions on the basis of the required optical properties of the optical body, i.e., whether, for instance, bundling and/or deflection of the optical radiation is to take place. The optical bodies are all of a symmetrical shape and the selected symmetry (for example, point symmetry, axis symmetry) depends on the optical properties that are required or to be specified and on the design of the transmission/receiving elements of the associated transmission/receiving unit (in the case of similar transmission/receiving units the same shape is selected by preference and thus the same symmetry of the optical body). For instance, the optical body is designed as a circular disk or as a cuboid; the arrangement of the grooved structure on the structured surface side of the optical body can, for example, be rotationally symmetric in the form of concentric circles or in the form of parallel lines. In order to reduce the size and weight, the grooved structure is preferably made in such a way that as many grooves as possible are formed on an optical body that is as thin as possible.

The optical body/bodies consists/consist of a transparent material with a refractive index differing from that of the optical path (for example, a plastic material). The optical body/bodies serves/serve to deflect the direction of radiation and/or to bundle the radiation, and where the structured surface side on the one hand acts as mirror surface in order to realize a large deflection angle of the optical radiation on account of the total reflection and on the other hand acts as an optically refractive surface for deflecting/bundling the optical radiation emitted from the transmission unit in a specific direction in space or for deflecting/bundling the optical radiation to be detected by the receiving unit from a specific direction in space on the receiving unit.

The optical unit of the optical system combines several advantages:

- it is of simple and therefore of low-cost design: the optical body is of compact construction (small thickness) and thus of small size, the optical body can be manufactured simply (for example by injection molding) and therefore at low cost;
- the optical properties can be improved: the deflection/bundling of the optical radiation is accomplished in a simple manner without reflection losses by total reflection/refraction, the deflection angle of the optical radiation can assume high values, thus also making "quasi Fresnel lens" possible with large aperture, the stray light content of the optical radiation can be minimized by adapting the prism angle to the transmission or receiving characteristic at the specific location of the lens, by varying the slope angle or prism angle the main receiving direction can be varied and the radiation can be bundled from the main receiving direction, with a small size of construction a specific predefinable zone (e.g. with a conical surface) can be illuminated;
- any kind of optical radiation can be used: in particular visible light or IR radiation.

BRIEF DESCRIPTION OF THE DRAWINGS

The invention will now be described in more detail on the basis of an embodiment example shown in the drawing with FIGS. 1 to 5: the optical unit of an optical system used as an optical theft-prevention alarm system in motor vehicles and operating with IR radiation.

DESCRIPTION OF A PREFERRED EMBODIMENT

Figure 1:
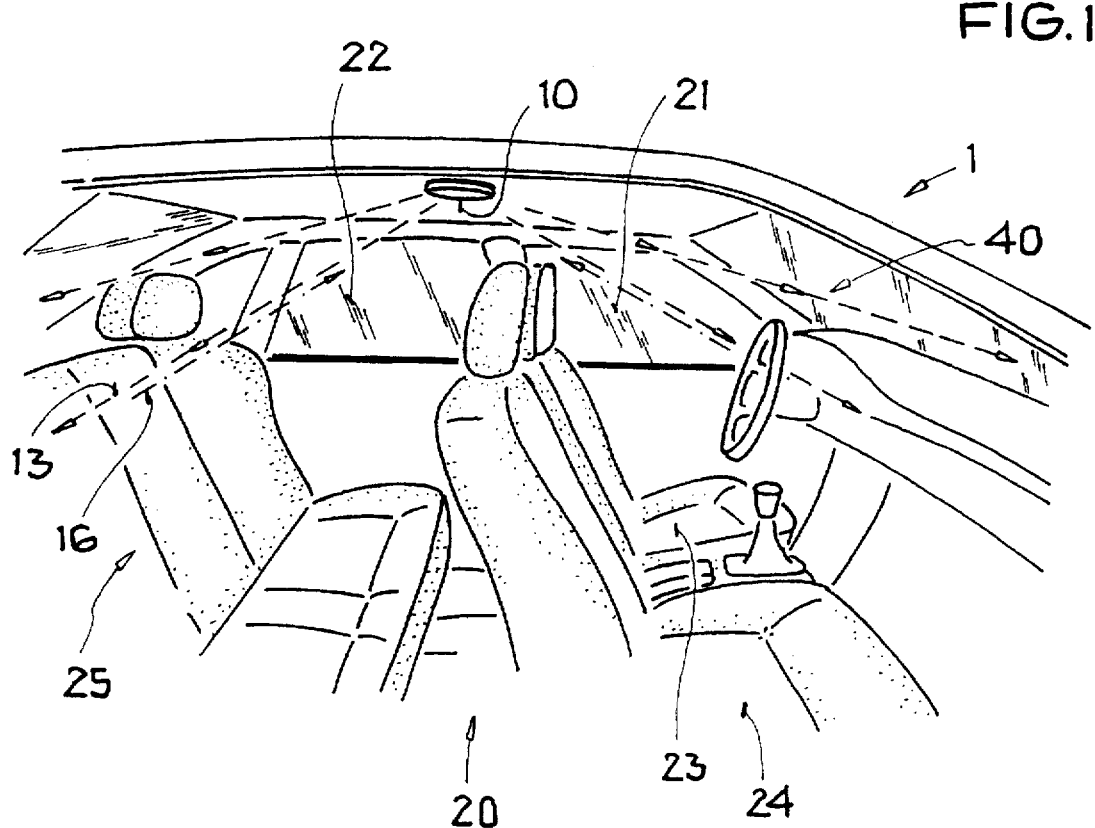
FIG. 1 shows a side view of the motor vehicle.

FIG. 1 shows in a side view the interior 20 of the motor vehicle 1 with the side windows 21, 22, the front seats 23, 24 and the rear seats 25 as well as the optical unit 10 fitted centrally in the motor vehicle 1 (for example, under the roof in the region of the interior light); for example, an optical body is assigned to and located in the immediate proximity of the transmission unit of the optical unit 10 and another optical body is assigned to and located in the immediate proximity of the receiving unit of the optical unit 10. The monitoring zone of the alarm system is determined by suitable deflection of the radiation 13 emitted from the transmission unit of the optical unit 10 or by suitable deflection of the radiation 16 (reflected in the interior of motor vehicle 1) detected by the receiving unit of the optical unit 10 after having passed through the optical path 40. The directional characteristic of the optical radiation 13, 16 which can, for example, be IR radiation (with a wavelength of 950 nm, for example) is determined by designing the optical unit 10 appropriately.

Figure 2:
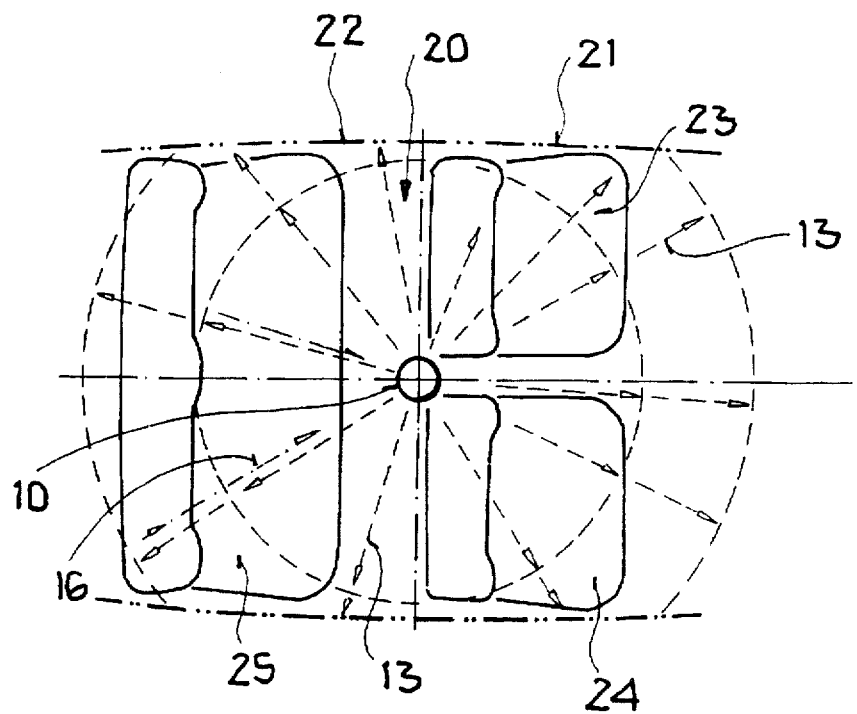
FIG. 2 shows a top view of the monitoring zone of the alarm system.

FIG. 2 shows, for the interior 20 of motor vehicle 1, the illumination zone of the radiation 13 emitted from the transmission unit of the optical unit 10, corresponding approximately to the monitoring zone of the alarm system defined by the optical unit 10 (the interior 20 of motor vehicle 1 is shown here in top view with the front seats 23, 24 and the rear seats 25 drawn in schematically). As can be seen from the monitoring zone of the alarm system, effective protection is provided against break-ins into the interior 20 of motor vehicle 1 through the side-window panes 21, 22 or against the removal of objects from the interior 20 of motor vehicle 1 through the side-window panes 1, 22.

Figure 3:
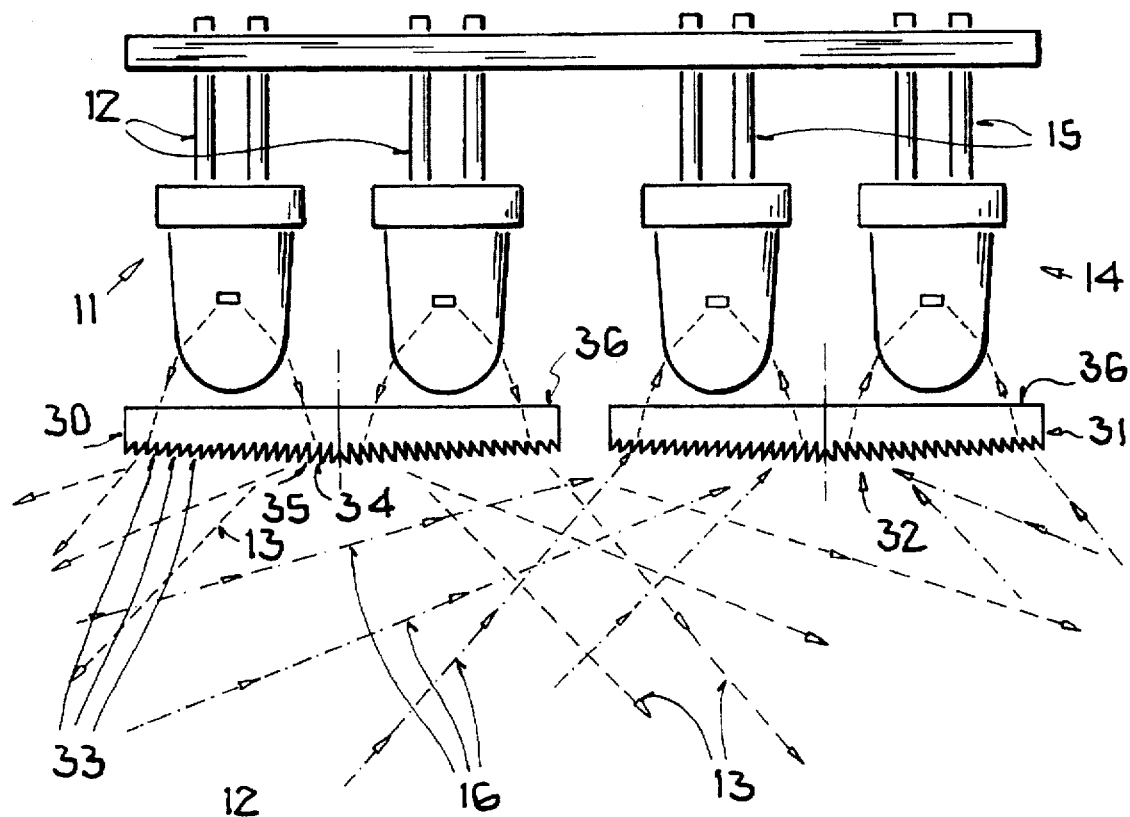
FIG. 3 shows the optical unit.

In accordance with FIG. 3, the optical unit 10 of the alarm system has an IR transmission unit 11 with the transmission elements 12 (IR transmission diodes) and an IR receiving unit 14 with the receiving elements 15 (IR receiving diodes). In the optical path 40, there are two optical bodies 30, 31 in the form of quasi Fresnel lenses. The two optical bodies 30, 31 are of similar type and are designed as circular disks, where one surface side 36 of the optical bodies 30, 31 is unstructured and a grooved structure of indentations 33 is provided in the opposite surface side 32 of the optical bodies 30, 31. The optical body 30 assigned to the transmission unit 11 serves to bundle the IR radiation 13 emitted from the transmission elements 12, and the optical body 31 assigned to the receiving unit 14 serves to deflect or bundle the IR radiation 16 injected into the receiving elements 15 of the receiving unit 14. The optical bodies 30, 31 are made, for example, of plexiglass and have a diameter of 20 mm and a thickness of 2 mm. Notch-shaped indentations 33 with a depth of 0.4 mm to 1.1 mm and a width of 0.5 mm are provided in that surface side 32 of optical bodies 30, 31 which is turned away from transmission unit 11 or receiving unit 14, respectively.

Figure 4:
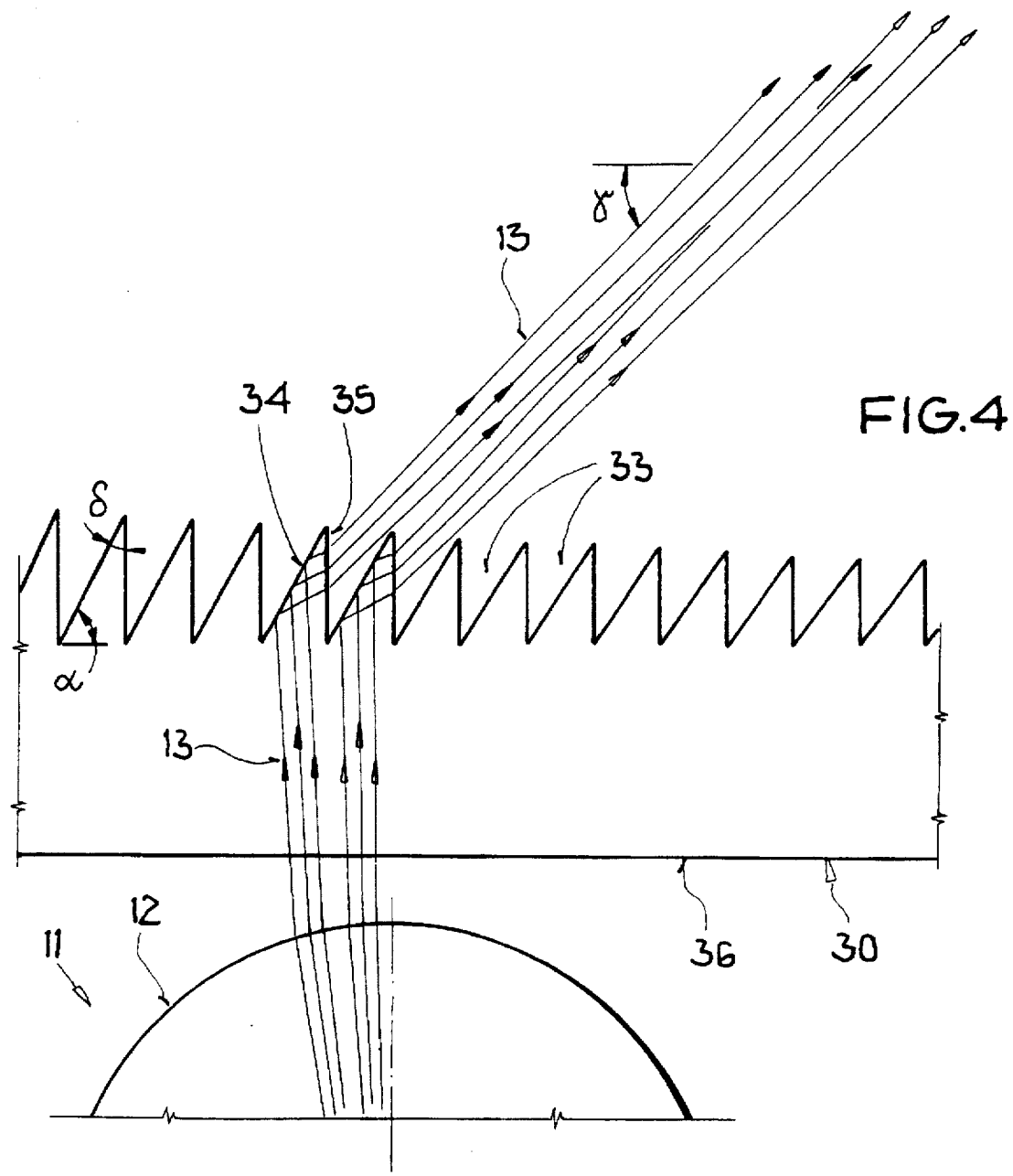
FIG. 4 shows a detailed view of the radiation beam in the optical unit.

As can be seen from the detail view of the transmission unit 11 of optical unit 10 in FIG. 4 (and similarly for the receiving unit 14 of optical unit 10), the indentations 33 cause the creation of total reflection and prismatic partial zones leading to refraction with a slope angle $\alpha$ of 40° to 65° or with a peak angle $\delta$ of 25° to 50° complementary to the slope angle $\alpha$ (where $\alpha+\delta=90°$). Consequently, the optical radiation 13, 16 from the transmission elements 12 of the transmission unit 11 or to the receiving elements 15 of the receiving unit 14 are totally reflected at the first boundary surface 34 and refracted at the second boundary surface 35 in a specific direction under the deflection angle $\gamma$ (e.g. $\gamma=45°$); by selecting the indentations 33 and thus the slope angle $\alpha$ or the prism angle $\delta$, it is ensured that on the one hand total reflection occurs at the first boundary surface 34 and that on the other hand the refracted radiation at the second boundary surface 35 can escape from the optical bodies 30, 31 (under a large deflection angle $\gamma$)

Figure 5:
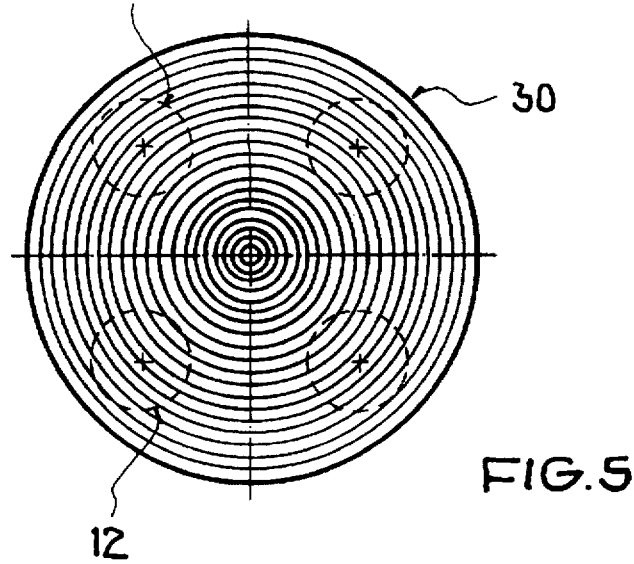
FIG. 5 shows a top view on the optical unit.

As shown in FIG. 5, the transmission unit 11 has for example four IR transmission diodes 12, of which in each case one transmission diode 12 is assigned to a quadrant of the optical body 30 that has a grooved structure consisting of indentations 33 in the form of concentric circles; the equidistantly spaced transmission diodes 12 of the transmission unit 11 are separated by, for example, 0.5 mm from the optical body 30. The receiving unit 14, not shown in FIG. 4, is constructed in the same way as transmission unit 11, i.e., four IR receiving diodes 15 are arranged equidistantly at a distance of 0.5 mm from the optical body 31.

What is claimed is:

1. Optical system with an optical unit comprising:
   a) a transmission unit with at least one transmission element for emitting optical radiation;
   b) a receiving unit with at least one receiving element for detecting optical radiation;
   c) an optical path for transmitting the optical radiation between transmission unit and receiving unit;
   wherein:
   d) at least one optical body is located in the optical path to bundle and deflect the optical radiation, with the at least one optical body being assigned either to the transmission unit or the receiving unit;
   e) the at least one optical body is a type of Fresnel lens having an unstructured surface side, and a structured surface side having indentations, with flanks having a slope angle ($\alpha$) and a prism angle ($\delta$), arranged in concentric circles, with the indentations having a notch shape with the slope angle ($\alpha$) of the flanks of the indentations increasing in a direction from the edge to the center of the at least one optical body, and with the prism angle ($\delta$) decreasing in a direction from the edge to the center of the at least one optical body; and,
   f) the structured surface side of the at least one optical body with indentations provides a first boundary zone for total reflection and a second boundary zone for refraction of the optical radiation emitted from the transmission unit or of the optical radiation to be detected by the receiving unit and is turned away from either the transmission unit or the receiving unit.

2. Optical system in accordance with claim 1, wherein the at least one optical are made in the form of body is a circular disk.

3. Optical system in accordance with claim 1, wherein the slope angle ($\alpha$) of the flanks of the indentations is in the range between 40° and 65°.

4. Optical system with an optical unit comprising:
   a) a transmission unit with at least one transmission element for emitting optical radiation;
   b) a receiving unit with at least one receiving element for detecting optical radiation;
   c) an optical path for transmitting the optical radiation between the transmission unit and the receiving unit; and wherein:
- d) at least one optical body is located in the optical path to bundle and deflect the optical radiation, with the at least one optical body being assigned either to the transmission unit or to the receiving unit;
- e) the at least one optical body is a type of Fresnel lens have an unstructured surface side and a structured surface side having indentations with flanks, a slope angle ($\alpha$) for the flanks in the range between 40° and 65°, and a prism angle ($\delta$) complementary to the slope angle; and,
- f) the structured surface side of the at least one optical body with indentations provides a first boundary zone for total reflection and a second boundary zone for refraction of the optical radiation emitted from the transmission unit or of the optical radiation to be detected by the receiving unit, and is turned away from either the transmission unit or the receiving unit.

5. Optical system in accordance with claim 4, wherein the indentations are arranged in concentric circles on the structured surface side of the at least one optical body.

6. Optical system in accordance with claim 5, wherein the indentations arranged on the structured surface side of the at least one optical body are of notch shape with a slope angle ($\alpha$) of the flanks of the indentations that increases in a direction from the edge of the at least one optical body to the center of the at least one optical body and a prism angle ($\delta$) that decreases in a direction from the edge to the center of the at least one optical body.

7. Optical system in accordance with claim 4, wherein the at least one optical body is a circular disk.

8. Optical system in accordance with claim 7, wherein the indentations are concentric circles on the structured surface side of the at least one optical body.

9. Optical system in accordance with claim 8, wherein the indentations arranged on the structured surface side of the at least one optical body are of notch shape with a slope angle ($\alpha$) of the flanks of the indentations that increases in a direction from the edge to the center of the at least one optical body and a prism angle ($\delta$) that decreases in a direction from the edge to the center of the at least one optical body.

* * * * *